(12) United States Patent
Sung et al.

(10) Patent No.: US 9,849,548 B2
(45) Date of Patent: Dec. 26, 2017

(54) METHOD OF MANUFACTURING COOLING BLOCK FOR HOT STAMPING MOLD USING THREE-DIMENSIONAL METAL PRINTER

(71) Applicant: KOREA INSTITUTE OF INDUSTRIAL TECHNOLOGY, Chungcheongnam-do (KR)

(72) Inventors: Ji Hyun Sung, Daegu (KR); Myoung Pyo Hong, Daegu (KR); Woo Sung Kim, Gyeongsangnam-do (KR); Chang Yeul Shin, Gyeongsangbuk-go (KR); Ki Man Bae, Daegu (KR); Ji Hyun Kim, Daegu (KR)

(73) Assignee: KOREA INSTITUTE OF INDUSTRIAL TECHNOLOGY, Chungcheongnam-do (KR)

( * ) Notice: Subject to any disclaimer, the term of this patent is extended or adjusted under 35 U.S.C. 154(b) by 112 days.

(21) Appl. No.: 14/888,747

(22) PCT Filed: Jun. 10, 2015

(86) PCT No.: PCT/KR2015/005819
§ 371 (c)(1),
(2) Date: Nov. 3, 2015

(87) PCT Pub. No.: WO2016/068434
PCT Pub. Date: May 6, 2016

(65) Prior Publication Data
US 2016/0339546 A1 Nov. 24, 2016

(30) Foreign Application Priority Data
Oct. 28, 2014 (KR) ........................ 10-2014-0147797

(51) Int. Cl.
*B21D 37/16* (2006.01)
*B22F 7/06* (2006.01)
(Continued)

(52) U.S. Cl.
CPC .............. *B23P 15/26* (2013.01); *B21D 22/02* (2013.01); *B21D 37/16* (2013.01); *B22F 3/1055* (2013.01);
(Continued)

(58) Field of Classification Search
CPC ....... B23P 15/26; B23P 15/24; B23P 2700/10; B21D 22/02; B21D 37/16; B22F 3/1055;
(Continued)

(56) References Cited

U.S. PATENT DOCUMENTS 4,453,253 A * 6/1984 Lauria ...................... F27D 1/12
373/74
5,426,664 A * 6/1995 Grove ...................... F27B 3/24
110/336
(Continued)

FOREIGN PATENT DOCUMENTS

CN 103587005 2/2014
CN 104354278 2/2015
(Continued)

OTHER PUBLICATIONS

Hong et al., Hot Press Metallic Mold . . . , Apr. 16, 2016, EPO English Machine Translation, pp. 1-6.*
(Continued)

*Primary Examiner* — Bayan Salone

(57) ABSTRACT

The present disclosure relates to a method of manufacturing a cooling block for a hot stamping mold using a three-dimensional (3D) metal printer, and more particularly, to a method of manufacturing a cooling block for a hot stamping mold using a 3D metal printer including a process of first step for forming a plurality of semicircular channels through which a fluid passes on a lower block, and a process of second step for forming an upper block to form channels using a 3D metal printer respectively on the plurality of semicircular channels formed in the lower block along the plurality of semicircular channels.

3 Claims, 6 Drawing Sheets

(51) Int. Cl.
| | |
|---|---|
| *B23P 15/24* | (2006.01) |
| *B23P 15/26* | (2006.01) |
| *C22C 38/00* | (2006.01) |
| *C22C 38/02* | (2006.01) |
| *C22C 38/38* | (2006.01) |
| *B21D 22/02* | (2006.01) |
| *B22F 3/105* | (2006.01) |
| *B33Y 10/00* | (2015.01) |
| *C22C 38/22* | (2006.01) |
| *B33Y 80/00* | (2015.01) |

(52) U.S. Cl.
CPC .............. *B22F 7/06* (2013.01); *B23P 15/24* (2013.01); *C22C 38/38* (2013.01); *B23P 2700/10* (2013.01); *B33Y 10/00* (2014.12); *B33Y 80/00* (2014.12); *C22C 38/002* (2013.01); *C22C 38/02* (2013.01); *C22C 38/22* (2013.01); *Y10T 29/4935* (2015.01); *Y10T 29/49393* (2015.01)

(58) Field of Classification Search
CPC ......... B22F 7/06; C22C 38/38; C22C 38/002; C22C 38/02; C22C 38/22; Y10T 29/49393; Y10T 29/4935
USPC ........ 29/890.051, 890.054; 420/34, 104, 117
See application file for complete search history.

(56) References Cited

U.S. PATENT DOCUMENTS

| | | | | |
|---|---|---|---|---|
| 8,215,147 | B2* | 7/2012 | Horton | B21J 13/02 148/654 |
| 8,656,750 | B2* | 2/2014 | Horton | B21J 13/02 148/654 |
| 9,061,340 | B2* | 6/2015 | Lee | B21D 35/006 |
| 2012/0247171 | A1* | 10/2012 | Horton | B21J 13/02 72/342.3 |
| 2013/0309342 | A1* | 11/2013 | Blais | B29C 45/2738 425/144 |
| 2013/0344258 | A1* | 12/2013 | Covey | C23C 18/14 427/586 |

FOREIGN PATENT DOCUMENTS

| | | |
|---|---|---|
| JP | 2004-027328 | 1/2004 |
| JP | 2004027328 A * | 1/2004 |
| JP | 2004-132556 | 4/2004 |
| JP | 2008-240041 | 10/2008 |
| KR | 10-2002-0087648 | 11/2002 |
| KR | 10-1317414 | 10/2013 |
| KR | 10-1365195 | 2/2014 |
| KR | 101365195 B1 * | 2/2014 |

OTHER PUBLICATIONS

Shingo et al., Method for Manufacturing a mold, Apr. 16, 2017, EPO Machine Translation, pp. 1-6.*
International Search Report dated Sep. 21, 2015 for PCT/KR2015/005819.
Written Opinion of the International Search Report dated Sep. 21, 2015 for PCT/KR2015/005819.
Office Action dated May 18, 2017 corresponding to Chinese Patent Application No. 2015-80000608.7, 7 pages.
Woosung Kim et al., "Effects and Application Cases of Injection Molds by using DED type Additive Manufacturing Process", *Journal of Welding and Joining*, vol. 32, No. 4 (2014) pp. 10-14.
Dong-Gyu Ahn et al. "A Study on the Design of Cooling Channels of Injection Mould to Manufacture a Flat Part with a Party Thick Volume", *Journal of the Korean Society for Precision Engineering*, vol. 29, No. 8 (Aug. 2012) pp. 824-833.

* cited by examiner

FIG. 11
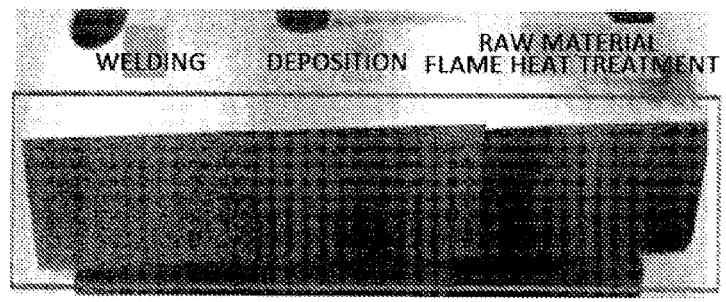
FIG. 12
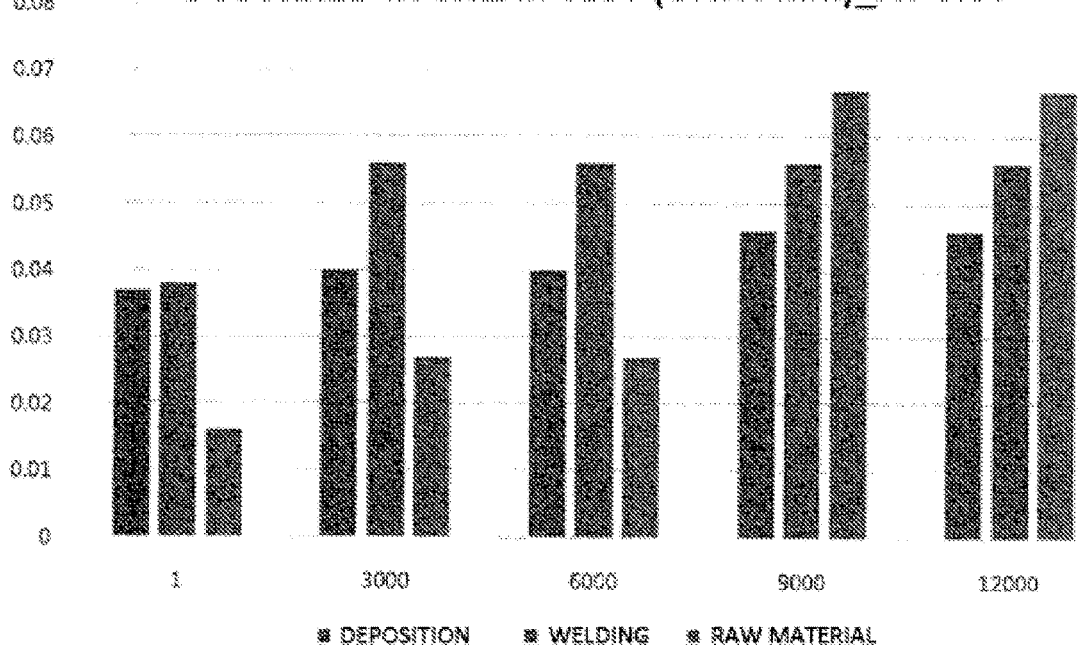
FIG. 13
| HRC HARDNESS AFTER DEPOSITION OF INVENTIVE METAL POWDER | | | | | AVERAGE VALUE OF FIVE MEASUREMENTS |
|---|---|---|---|---|---|
| 58.7 | 58.6 | 57.2 | 59.6 | 59.5 | 58.72 |
| HRC HARDNESS AFTER DEPOSITION OF SKD11 POWDER | | | | | AVERAGE VALUE OF FIVE MEASUREMENTS |
| 44.8 | 44.8 | 43.2 | 46.2 | 44.5 | 44.74 |
| HRC HARDNESS AFTER DEPOSITION OF SKD61 POWDER | | | | | AVERAGE VALUE OF FIVE MEASUREMENTS |
| 50 | 52.1 | 52.5 | 53.4 | 51.7 | 51.94 |

METHOD OF MANUFACTURING COOLING BLOCK FOR HOT STAMPING MOLD USING THREE-DIMENSIONAL METAL PRINTER

This application claims the priority of Korean Patent Application No. 10-2014-0147797, filed on Oct. 28, 2014 in the KIPO (Korean Intellectual Property Office), the disclosure of which is incorporated herein entirely by reference. Further, this application is the National Stage application of International Application No. PCT/KR2015/005819, filed Jun. 10, 2015, which designates the United States and was published in Korean. Each of these applications is hereby incorporated by reference in their entirety into the present application.

TECHNICAL FIELD

The present disclosure relates to a method of manufacturing a cooling block for a hot stamping mold using a three-dimensional (3D) metal printer, and more particularly, to manufacturing a cooling block of a hot stamping mold by using an expensive material to only a part which comes into contact with a material in the hot stamping mold and thus requires durability and mechanical properties by use of a 3D metal printer.

Particularly, by the application of a processing technique that fabricates cooling channels by inserting copper tubes at equal intervals on a curved surface of a product impossible to work by a conventional gun drilling process and a deposition technique for different materials, a high functional material is only used for a part which comes into contact with a material in a hot stamping mold and thus requires durability and mechanical properties in order to maximize the cooling efficiency, and a less expensive metal is applied to a non-functional part.

BACKGROUND ART

Generally, hot stamping is a method in which a steel material heated to the high temperature of 950° C. is put in a mold and is subjected to press molding and rapid cooling in the mold, and is used to produce a high strength component through heating a material to high temperature by a panel molding method which molds a steel sheet under the high temperature condition to make a car body that reduces in weight while maintaining stiffness, and then through press molding and cooling a mold itself.

The mold used in hot stamping is referred to as a hot stamping mold, and a cooling block having channels through which cooling water passes is provided within the hot stamping mold.

According to the related art, Korean Patent No. 10-0907266 (a mold for forming a hot stamping material), the mold for forming a hot stamping material is provided to fabricate cooling channels for cooling a mold used in molding a steel sheet under the high temperature condition in a simple and convenient manner in order to improve fuel efficiency of vehicles, characterized by including a mold having grooves on a surface opposite to a contact surface with a product, tubular cooling water channels inserted into the grooves, and an insulating member installed on the surface of the mold to bury the cooling water channels, wherein the grooves are formed on one side of the mold at equal intervals, into which each of the plurality of cooling water channels is inserted, and the insulating member has spacing plates to support both sides of the cooling water channels, the spacing plates protrusively formed to be inserted into the corresponding grooves.

According to another related art, Korean Patent No. 10-1317414 (a mold for hot stamping and a manufacturing method thereof), the mold for hot stamping and its manufacturing method includes: a base plate configured to receive and exhaust a coolant through a nipple mounted on one side; at least one exterior mold mounted on one surface of the base plate and formed in a same shape as an external shape of a product to form the external shape of the product during hot stamping, and having a mounting space inside; and an insert block coupled to the exterior mold while being inserted into the mounting space of the exterior block to allow the coolant to flow to the mounting space, and mounted between the base plate and the exterior block to allow the coolant having flowed in through the base plate between the base plate and the exterior block to flow on the mounting space of the exterior block, and claim 10 recites a method of manufacturing a mold for hot stamping including: preparing a lower mold and an upper mold with different materials and working insides of the lower mold and the upper mold; disposing the upper mold on the lower mold of which the insides were worked and performing diffusion jointing by applying pressure to the lower mold and the upper mold together at the temperature below the melting point of each mold; rough grinding appearances of the lower mold and the upper mold assembled through the above step; after the appearance processing is completed, heat-treating the assembled lower mold and upper mold; after the heat-treating of the assembled lower mold and upper mold is completed, assembling the heat-treated lower mold and upper mold to a base plate; and after the mounting on the base plate is completed, finishing appearances of the assembled lower mold and upper mold, wherein diffusion jointing at the diffusion jointing step of the lower mold and the upper mold is performed in a vacuum, and a diffusion layer is formed between contacting surfaces of the lower mold and the upper mold, and the lower mold and the upper mold are thereby assembled.

However, the traditional molds such as the above are prone to corrosion due to cooling water, and have low cooling efficiency.

DISCLOSURE OF THE INVENTION

Technical Problem

To solve the above problem, the present disclosure is directed to providing a method of manufacturing a hot stamping mold using three-dimensional (3D) deposition processing, which fabricates cooling channels formed at equal intervals on a curved surface of a product impossible to process by a conventional gun drilling process, the method involving making a cooling block used in hot stamping from a less expensive material, and forming only a contact part between a lower mold and an upper mold from an expensive material with high thermal conductivity via 3D deposition processing, thereby curtailing material costs and maximizing the cooling performance, leading to improvements in economic efficiency and procedural efficiency.

Technical Solution

The method of manufacturing a cooling block for a hot stamping mold using a 3D metal printer according to the present disclosure includes a process of first step for forming a plurality of semicircular channels through which a fluid passes on a lower block, and a process of second step for forming an upper block to form channels using a 3D metal printer respectively on the plurality of semicircular channels formed in the lower block along the plurality of semicircular channels.

Advantageous Effects

The method of manufacturing a cooling block for a hot stamping mold using a 3D metal printer according to the present disclosure makes a cooling block from a less expensive material, and forms only a contact part between a lower mold and an upper mold from an expensive material with high thermal conductivity via 3D deposition processing, thereby curtailing material costs and maximizing the cooling performance, leading to remarkable effects of economical and procedural efficiency improvements.

BRIEF DESCRIPTION OF THE DRAWINGS

FIG. 11 shows a surface photographic image after a shear operation of a shear mold to which metal powder for a 3D metal printer is applied.

FIG. 12 shows a comparison table of amounts of burrs occurred after a shear operation of a shear mold to which metal powder for a 3D metal printer is applied.

FIG. 13 shows a hardness comparison table of metal powder for a 3D metal printer.

MODE FOR CARRYING OUT THE INVENTION

Figure 1:
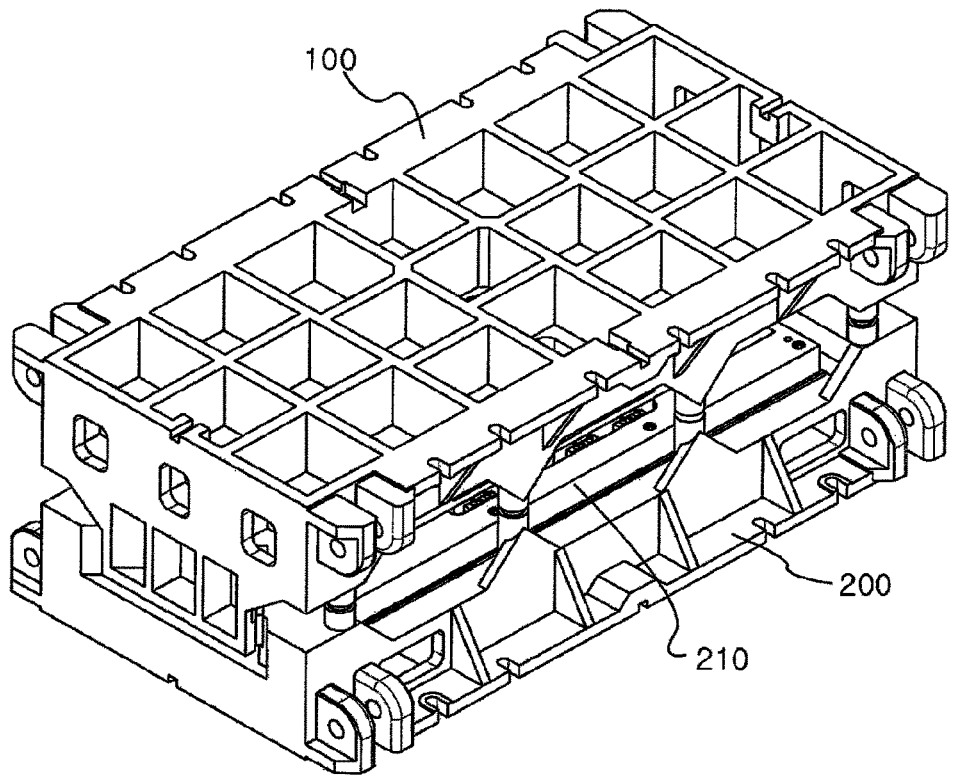
FIG. 1 is a perspective view of a general hot stamping mold.

A method of manufacturing a cooling block for a hot stamping mold using a three-dimensional (3D) metal printer according to the present disclosure includes a process of first step for forming a plurality of semicircular channels C through which a fluid passes on a lower block 212, and a process of second step for forming an upper block 211a to form a shape of circular channels C using a 3D metal printer respectively on the plurality of semicircular channels C formed in the lower block 212 along the plurality of semicircular channels C.

The process of second step may include forming the circular channels C by assembling a coupon 213 having semicircular grooves on the semicircular channels C formed in the lower block 212, and forming the upper block 211a by depositing metal powder as a 3D metal printer on the perimeter of the coupon 213.

The coupon 213 may have a slope surface with a decrease in width towards an upper surface from a lower surface where the semicircular grooves are formed.

The process of second step may include installing copper pipes 214 in the semicircular channels C formed in the lower block 212, and forming an upper block 211 by depositing metal powder as a 3D metal printer on the perimeter of the copper pipes 214.

The metal powder may include SKD61 species.

The metal powder may consist of 8-10% of Cr, 1.8-2.5% of Si, 0.25-0.35% of C, 2-3% of Mn, and a remainder of Fe, in weight %.

Hereinafter, a detailed description of the method of manufacturing a cooling block for a hot stamping mold using a 3D metal printer according to the present disclosure is provided below with reference to the accompanying drawings.

Figure 2:
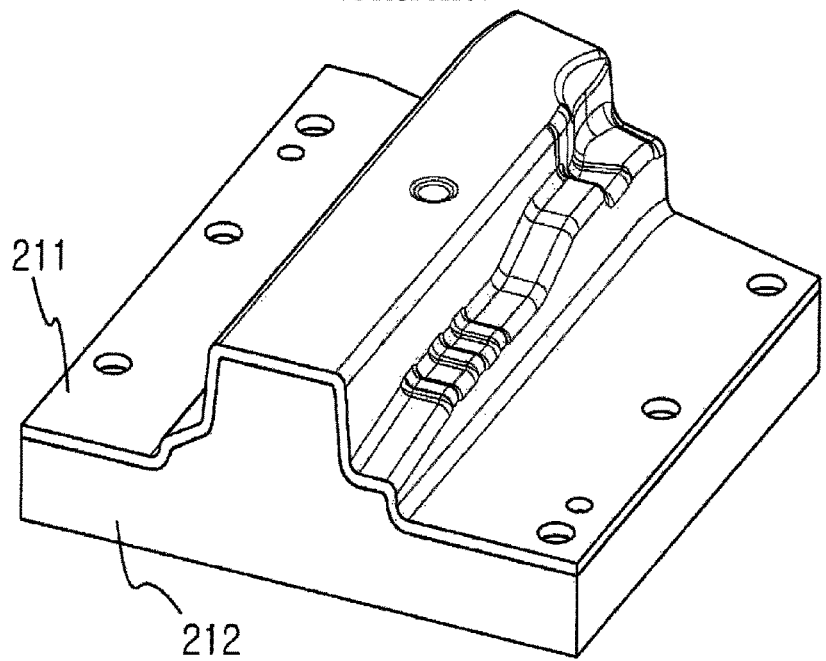
FIG. 2 is a perspective view of a cooling block of a general hot stamping mold.
Figure 3:
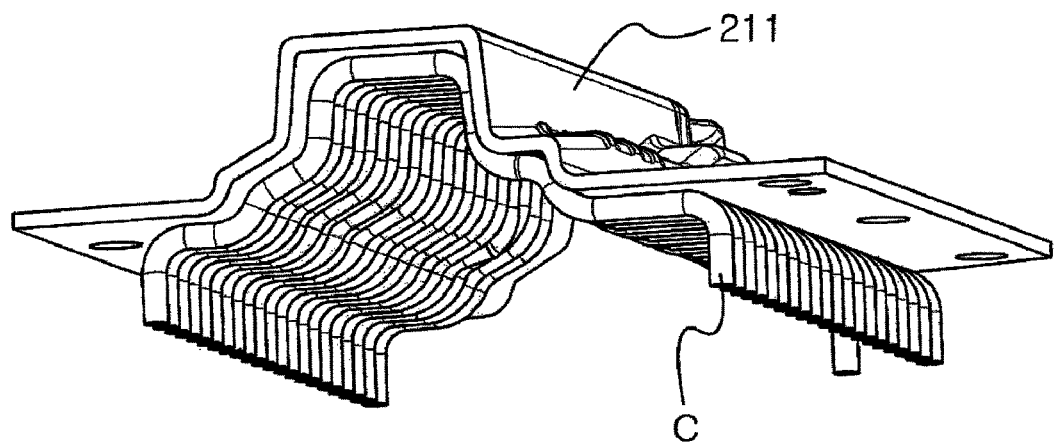
FIG. 3 is a partial perspective view of a cooling block of a general hot stamping mold.

FIG. 1 is a perspective view of a general hot stamping mold, FIG. 2 is a perspective view of a cooling block of the general hot stamping mold, and FIG. 3 is a partial perspective view of the cooling block of the general hot stamping mold.

For reference, a machine which prints a 3D object using metal powder as a toner is referred to as a 3D metal printer.

As shown in FIGS. 1 through 3, the hot stamping mold includes upper and lower molds 100 and 200, and in the hot stamping mold, a cooling block 200 is provided to cool a material molded by pressing within the upper and lower molds 100 and 200.

Generally, the upper and lower molds 100 and 200 are manufactured by casting.

The cooling block 200 has channels C inside as a passage through which cooling water moves, and generally, copper pipes 214 are installed and used as the channels C.

Thus, when cooling water flows through the copper pipes 214, heat is transferred by the cooling water, and the material and the upper and lower molds 100 and 200 are thus cooled.

However, because the copper pipes 214 are made of an expensive metal, it costs so much to manufacture the cooling block 200 having the plurality of channels C.

Figure 4:
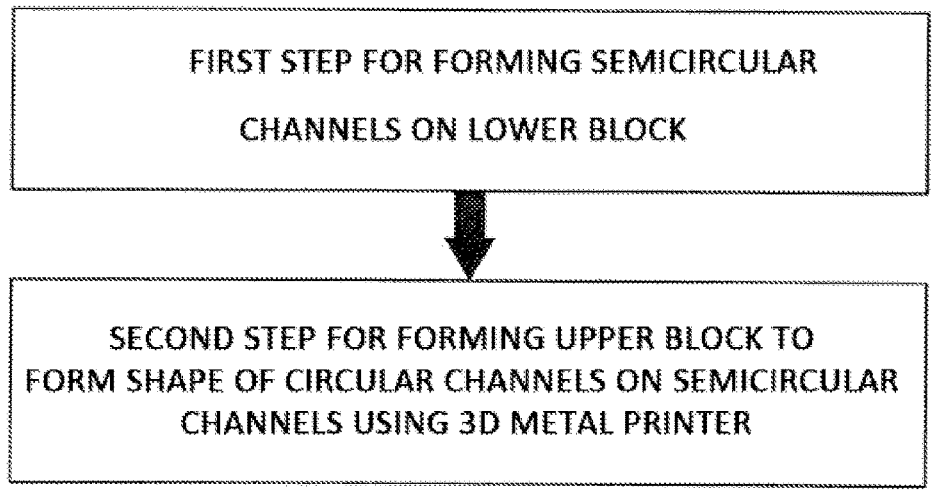
FIG. 4 is a diagram showing a process of manufacturing a cooling block for a hot stamping mold according to the present disclosure.
Figure 5:
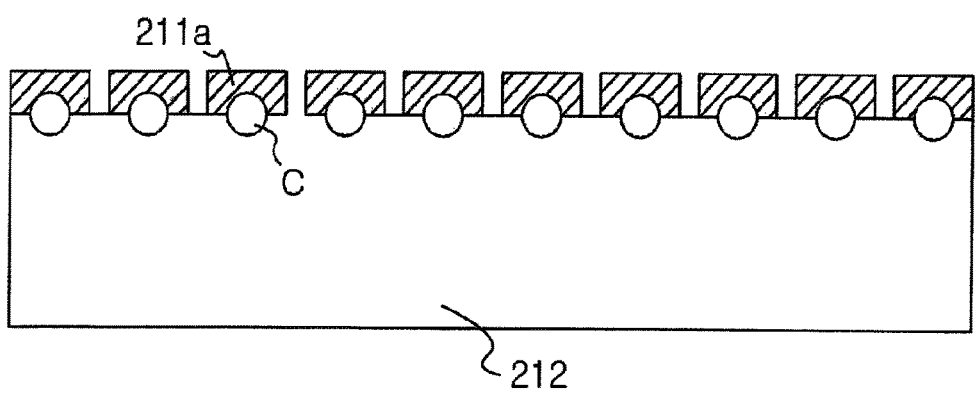
FIG. 5 is a schematic diagram of a cooling block of a hot stamping mold according to the present disclosure.

FIG. 4 is a diagram showing a process of manufacturing a cooling block for a hot stamping mold according to the present disclosure, and FIG. 5 is a schematic diagram of a cooling block of a hot stamping mold according to the present disclosure.

As shown in FIG. 4, the method of manufacturing a cooling block for a hot stamping mold according to the present disclosure includes a process of first step for forming a plurality of semicircular channels C through which a fluid passes on the lower block 212, and a process of second step for forming the upper block 211 to form a shape of circular channels C using a 3D metal printer respectively on the plurality of semicircular channels C formed in the lower block 212 along the plurality of semicircular channels C.

That is, the cooling block 200 is composed of the upper block 211 and the lower block 212, and the process of first step includes forming semicircular channels C through which a fluid passes on the lower block 212.

The process of second step includes forming the upper block 211 to form a shape of circular channels C using a 3D metal printer respectively on the plurality of semicircular channels C formed in the lower block 212 along the plurality of semicircular channels C.

The channels C are concave grooves in cross section, and may be formed in various shapes based on the shape of a material to be manufactured.

Figure 6:
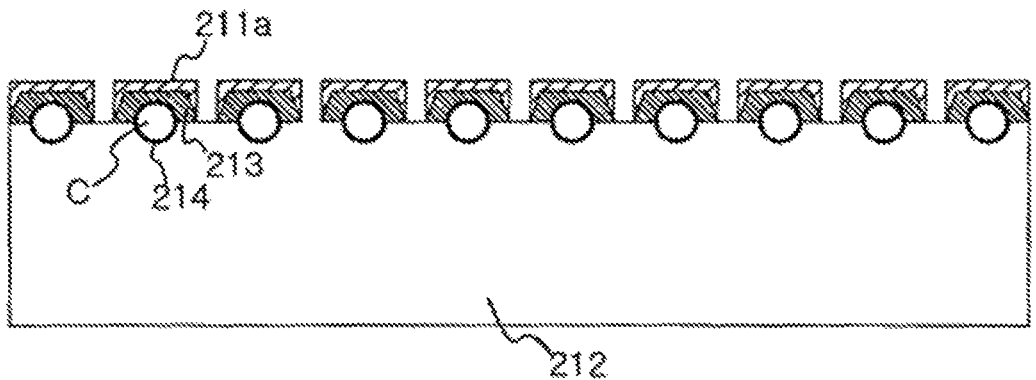
FIG. 6 is a schematic diagram of another embodiment of a cooling block of a hot stamping mold according to the present disclosure.

FIG. 6 is a schematic diagram of another embodiment of the cooling block of the hot stamping mold according to the present disclosure.

As shown in FIG. 6, the process of second step includes assembling the coupon 213 having semicircular grooves on the semicircular channels C formed in the lower block 212 to form circular channels C, and depositing metal powder as a 3D metal printer on the perimeter of the coupon 213 to make the upper block 211*a*.

In this instance, due to a size of an inlet through which molten metal powder is fed into the 3D metal printer, the coupon 213 has a slope surface with a decrease in width towards an upper surface from a lower surface where the semicircular grooves are formed, to prevent the interference between adjacent coupons 213.

That is, on the channels C, the coupon 213 having a vertical cross-sectional shape of ' ⌂ ' is coupled, and on the coupon 213, the upper block 211*a* having a vertical cross-sectional shape of ' ⌐⌐ ' is coupled.

Particularly, the metal powder used to make the upper block 211*a* is from materials with high thermal conductivity.

The process of second step may include installing copper pipes 214 in the semicircular channels C formed in the lower block 212, and forming the upper block 211 by depositing metal powder as a 3D metal printer on the perimeter of the copper pipes 214.

In the present disclosure, the metal powder for a 3D metal printer may include SKD61 species, or otherwise metal powder of the following composition.

The metal powder for a 3D metal printer according to the present disclosure may consist of 8-10% of Cr, 1.8-2.5% of Si, 0.25-0.35% of C, 2-3% of Mn, and a remainder of Fe, in weight %.

Cr is a metal which is excellent in corrosion resistance and mechanical properties, and when less than 8% of Cr is present, the effect of Cr in the composition is insignificant, and when more than 10% of Cr is present, the effect obtained by Cr is insignificant as compared to an increase in content, so the cost effectiveness reduces.

For reference, a steel alloy containing 12% or more of Cr is known as stainless steel.

C is an element which changes the properties of steel such as strength and hardness based on the content, and most carbon steels with the carbon content of 0.1-1.5% can be heat treated, and the metal powder of the present disclosure contains 0.25-0.35% of C.

Mn is an element which is hard, and is necessary to increase corrosion resistance and mechanical properties in metal alloying, and when less than 2% of Mn is present, its effect is insignificant, and when more than 3% of Mn is present, the effect obtained relative to an increase in content is low.

Si is an element which causes little chemical reaction and is grown on surfaces of other metals, and when less than 1.8% of Si is present, its effect is insignificant, and when more than 2.5% of Si is present, the effect obtained relative to the content fed is low.

Particularly, Mn and Si are an element necessary as a deoxidizer in steel making.

To improve the function of a metal product, the metal powder may further include 0.01-0.05% of P, 0.05-1.0% of Ni, 0.01-0.05% of Mo, 0.001-0.005% of Ti, 0.01-0.05% of V, 0.004-0.01% of Nb, 0.02-0.05% of W, 0.01-0.05% of Co, 0.004-0.01% of Zr, and 0.002-0.005% of B, in weight percent.

The P, Ni, Mo, Ti, V, Nb, W, Co, Zr, and B may be present singly or in combination.

P (phosphorus) is an extremely flammable element which spontaneously ignites in air, and when the content of P is less than 0.01%, ignitability is insignificant, less affecting the melting of the metal powder, and when the content of P is more than 0.05%, strong ignitability leads to ignition of all the other metals and brings the metal powder into too soft liquid state, making deposition difficult during a printing operation.

Ni (nickel) is an element which can forge and forge weld, is rich in ductility and flexibility, and is less prone to oxidization than iron, and it is used as a catalyst or for iron plating. When the content of Ni is less than 0.05%, its effect relative to Ni feeding is insignificant, and when the content is 1.0% or more, the effect obtained relative to the amount of Ni present is low.

Mo (molybdenum) is so mechanically strong over a wide temperature range, does not dissolve in ordinary acid, and does not erode in concentrated nitric acid. Molybdenum steel made by alloying with iron is used for a cutting tool. When the content of Mo is less than 0.01%, the effect obtained is insignificant, and when the content is more than 0.05%, the effect obtained relative to the content is reduced.

Ti (titanium) is an element which has high strength, ductility and flexibility, and forms an oxide film on surfaces and is less susceptible to corrosion in acid or sea water, and when the content is less than 0.001%, the effect from Ti inclusion is insignificant, and when the content is more than 0.005%, it costs so much in comparison to the effect obtained.

V (vanadium) forms alloys with steel or iron for use in high speed tool steel and steel for a high strength structure, and when less than 1% is present in steel, steel has a fine surface structure, and it reacts with carbon into carbide. When the content of V is less than 0.01%, the effect from V inclusion is insignificant, and when the content is more than 0.05%, the effect relative to cost is low.

Nb (niobium) is an element which does not erode in oxygen or strong acid and is added to provide heat resistance of stainless alloys. When the content of Nb is less than 0.004%, the effect from Nb inclusion is insignificant, and when the content is more than 0.01%, the effect is low as compared to the amount of Nb present.

W (tungsten) is used in high speed steel, permanent magnet steel, and heat resistant and anticorrosive alloys, and tungsten carbide is used in a tool. Because it is expensive, when less than 0.02% of W is present, the effect from W inclusion is insignificant, and when the content is more than 0.05%, the effect obtained is low as compared to the amount of W present.

Co (cobalt) is a shiny metal similar to iron and has strong magnetic property. It is less prone to melting when heated, and it rusts on surfaces but is less prone to corrosion in air, and is excellent in oxidization resistance, wear resistance, and mechanical properties. When less than 0.01% is present, the effect from Co feeding is low, and when 0.05% or more is present, the effect is low as compared to the amount of Co present.

Zr (zirconium) has high corrosion resistance in high temperature water. Zr is an element which forms an oxide film when exposed to air, exhibiting strong corrosion resistance, and powdered zirconium ignites in air, and when less than 0.004% is present, it ignites in air, causing no reaction, and when 0.01% or more is present, the effect is low as compared to the amount of Zr present, imposing an economic burden.

Figure 7:
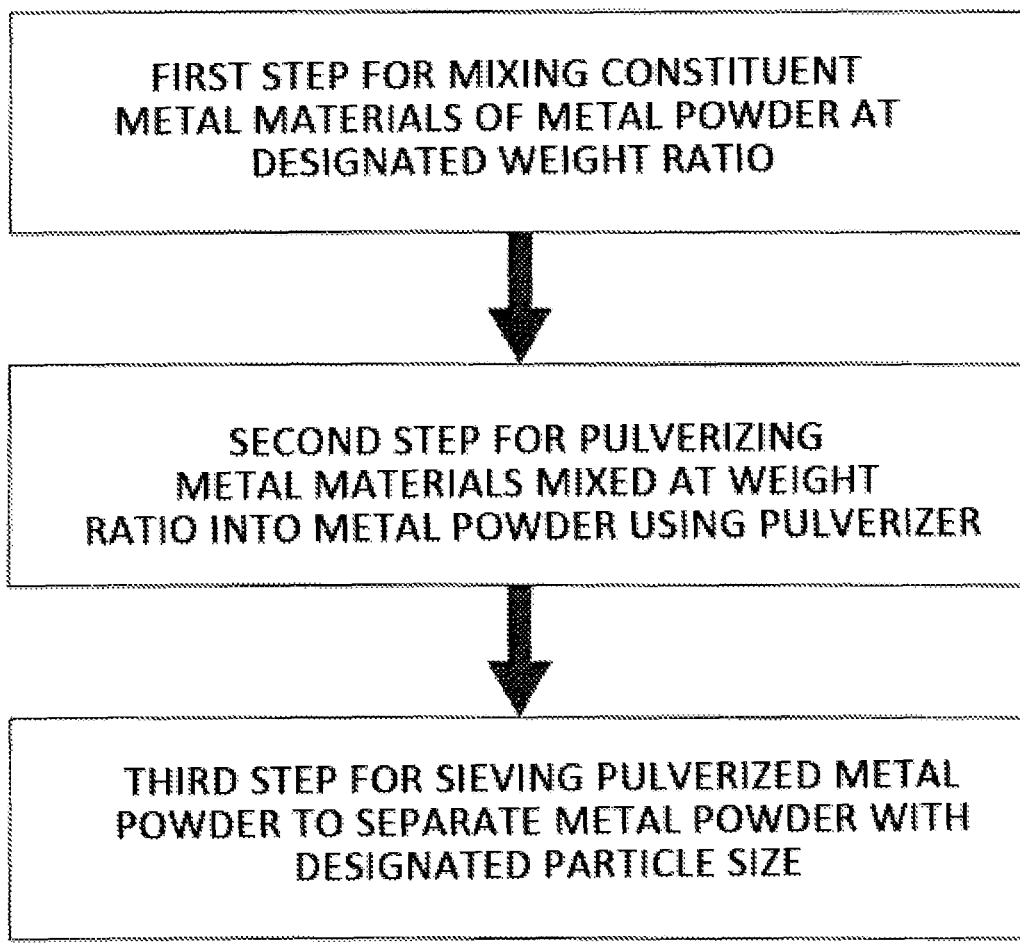
FIG. 7 is a diagram showing a process of preparing metal powder for a three-dimensional (3D) metal printer.

B (boron) has low reactivity but forms a compound with oxygen or nitrogen, and is used as a degasser in metal smelting, and a compound with C (carbon), B4C, is one of the hardest artificial materials, and when less than 0.002% is present, reactivity is weak, and when more than 0.005% is present, the effect obtained is low as compared to the amount introduced FIG. 7 is a diagram showing a process of preparing metal powder for a 3D metal printer.

As shown in FIG. 7, the process of preparing metal powder for a 3D metal printer according to the present disclosure includes a process of first step for preparing constituent metal materials of metal powder, and mixing the metal materials at a designated weight ratio.

The metal materials mixed at the process of first step undergo a process of second step for pulverizing into metal powder using a pulverizer.

As a process of third step, the metal powder produced at the second step is sieved through a sieving machine to separate metal powder with designated particles, impurities, and metal powder with larger particles.

Figure 8:
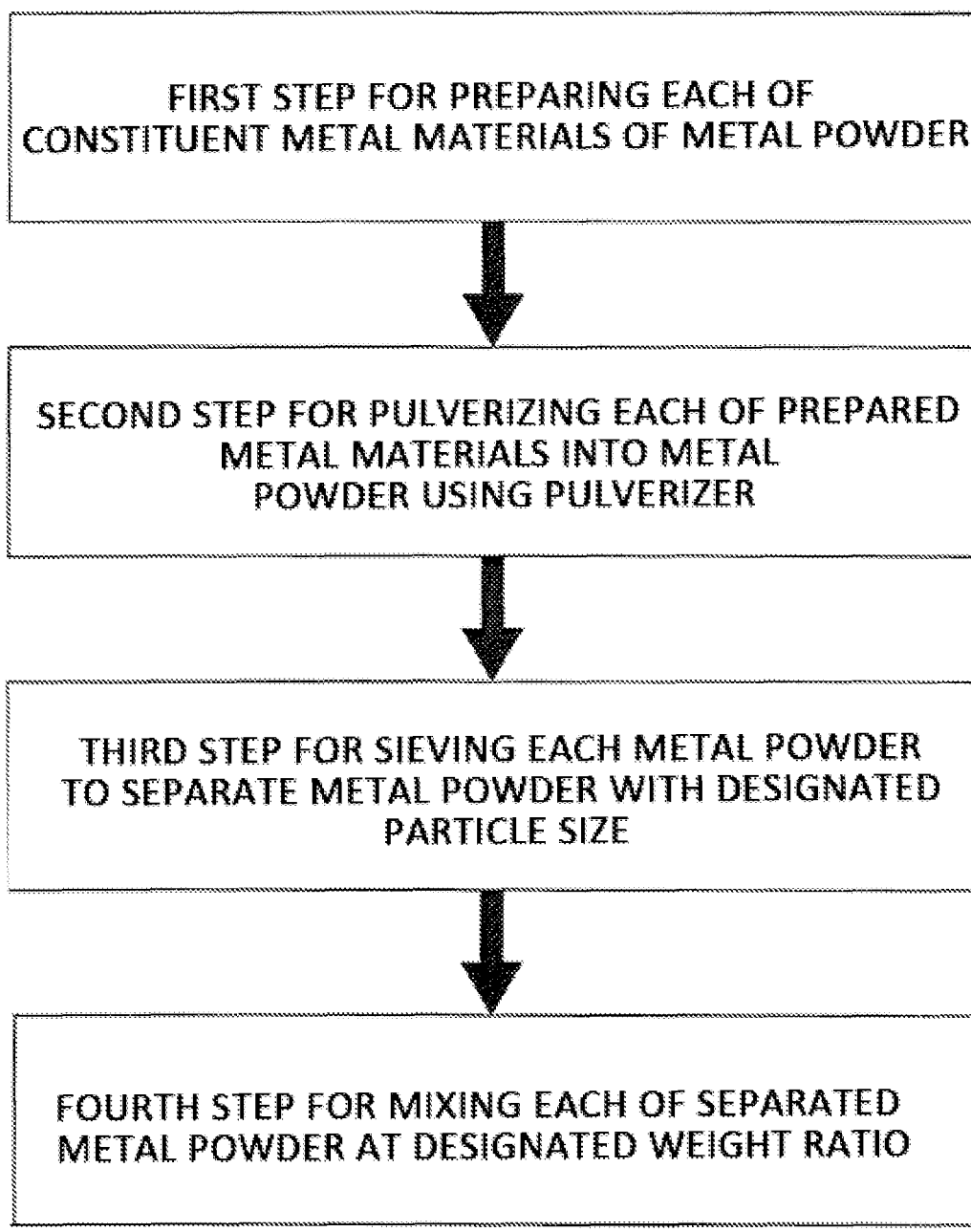
FIG. 8 is a diagram showing another process of preparing metal powder for a 3D metal printer.
Figure 9:
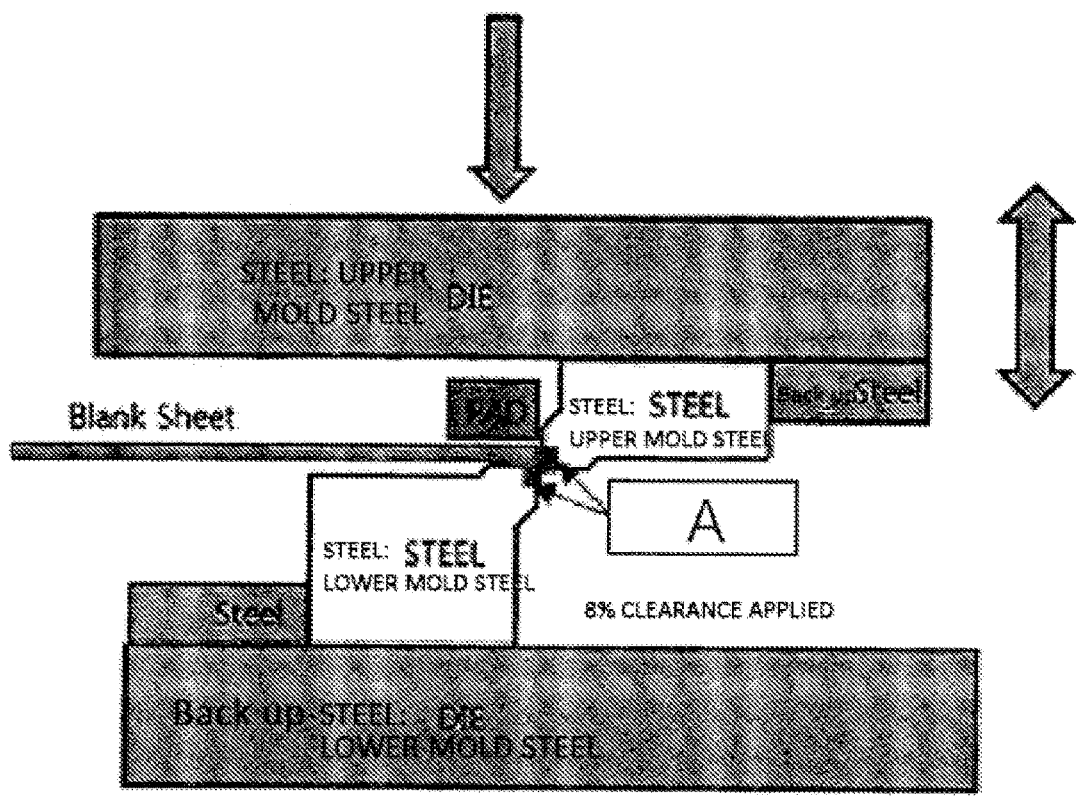
FIG. 9 shows a test apparatus of a shear mold to which metal powder for a 3D metal printer is applied.

FIG. 8 is a diagram showing another process of preparing metal powder for a 3D metal printer.

The process of preparing metal powder for a 3D metal printer according to the present disclosure includes a process of first step for preparing each of constituent metal materials of metal powder.

Each of the prepared metal materials undergoes a process of second step for pulverizing into metal powder using a pulverizer.

Each metal powder produced at the second step undergoes a process third step for sieving through a sieving machine to separate metal powder with a designated particle size, and finally, as a process of fourth step, each metal powder separated at the third step is mixed at a designated weight ratio.

The following is a test to which the metal powder is applied.

Figure 10:
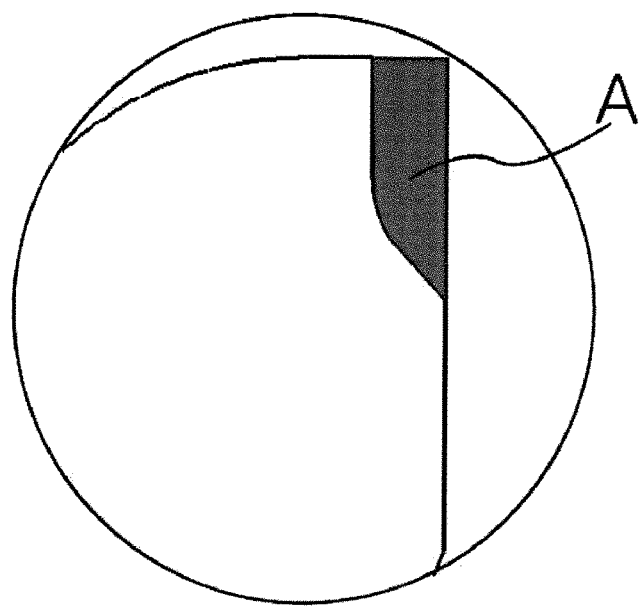
FIG. 10 is a detailed enlarged view of section A of FIG. 9.

FIG. 10 shows a test apparatus for a shear mold to which metal powder for a 3D metal printer is applied, and FIG. 11 is a detailed enlarged view of section A of FIG. 10.

As shown in FIGS. 10 and 11, based on 23F85 metal material, a shear mold is manufactured through welding, deposition, and flame heat treatment, respectively, applied to upper and lower notched parts which come into direct contact with a material during a shear operation.

A shear operation is performed using the shear molds manufactured as above.

FIG. 12 shows a surface photographic image after a shear operation of a shear mold to which metal powder for a 3D metal printer according to the present disclosure is applied.

As shown in FIG. 12, it can be seen that a shear mold made by welding or deposition has more smooth and clean surfaces than that of flame heat treatment.

FIG. 13 shows a comparison table of amounts of burrs occurred after a shear operation of a shear mold to which metal powder for a 3D metal printer according to the present disclosure is applied.

It shows deposition stability as a result of depositing metal powder of a different material according to the present disclosure on a basic material of a shear mold 23F5 cast steel, and it can be seen that after deposition, an amount of scratches occurred on the steel surface after a 12,000-stroke shear operation is smaller than those of welding and raw material heat treatment conditions.

FIG. 14 shows a hardness comparison table of metal powder for a 3D metal printer.

As metal powder generally has similar constituents to a welding rod by the present disclosure, a comparison was conducted by depositing the constituent materials of the welding rod, SKD11 powder and SKD61 powder, and as shown in FIG. 14, according to the test, it can be seen that the shear mold manufactured by the metal powder of the present disclosure has highest hardness.

On the other hand, the metal powder may be used singly or in combination with either SKD11 or SKD61, or both.

The method of manufacturing a cooling block for a hot stamping mold using a 3D metal printer according to the present disclosure makes a cooling block from a less expensive material, and forms only a contact part between a lower mold and an upper mold from an expensive material with high thermal conductivity via 3D deposition processing, thereby curtailing material costs and maximizing the cooling performance, leading to remarkable effects of economical and procedural efficiency improvements.

The invention claimed is:

1. A method of manufacturing a cooling block for a hot stamping mold using a three-dimensional (3D) metal printer, the method comprising:
   a process of first step for forming a plurality of semicircular channels through which a fluid passes on a lower block; and
   a process of second step for forming an upper block to form a shape of circular channels using a 3D metal printer respectively on the plurality of semicircular channels formed in the lower block along the plurality of semicircular channels,
   wherein the process of second step comprises forming circular channels by assembling a coupon having semicircular grooves on the semicircular channels formed in the lower block, and forming an upper block by depositing metal powder using a 3D metal printer on perimeter of the coupon,
   wherein the metal powder contains 8-10% of Cr, 1.8-2.5% of Si, 0.25-0.35% of C, 2-3% of Mn, and a remainder of Fe, in weight %.

2. The method of manufacturing a cooling block for a hot stamping mold using a 3D metal printer of claim 1, wherein the coupon has a slope surface with a decrease in width towards an upper surface from a lower surface where the semicircular grooves are formed.

3. The method of manufacturing a cooling block for a hot stamping mold using a 3D metal printer of claim 1, wherein the process of second step comprises installing copper pipes in the semicircular channels formed in the lower block, and forming an upper block by depositing metal powder using a 3D metal printer on perimeter of the copper pipes.

* * * * *